(12) United States Patent
Yang et al.

(10) Patent No.: US 11,653,281 B2
(45) Date of Patent: May 16, 2023

(54) DIFFERENTIATED MOBILITY SCHEMES AND NEIGHBOR LISTS

(71) Applicant: Verizon Patent and Licensing Inc., Basking Ridge, NJ (US)

(72) Inventors: Jin Yang, Orinda, CA (US); Francisco Xavier Sevilla Rubi, Edna, MN (US); Sung Mo Yang, San Ramon, CA (US); Navjot Sidhu, Mountain House, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1 day.

(21) Appl. No.: 17/178,761

(22) Filed: Feb. 18, 2021

(65) Prior Publication Data

US 2022/0264418 A1   Aug. 18, 2022

(51) Int. Cl.
| | |
|---|---|
| *H04W 36/38* | (2009.01) |
| *H04W 36/00* | (2009.01) |
| *H04W 8/02* | (2009.01) |
| *H04W 36/30* | (2009.01) |

(52) U.S. Cl.
CPC ............ *H04W 36/38* (2013.01); *H04W 8/02* (2013.01); *H04W 36/0016* (2013.01); *H04W 36/0061* (2013.01); *H04W 36/00837* (2018.08); *H04W 36/30* (2013.01)

(58) Field of Classification Search
CPC . H04W 36/38; H04W 36/00837; H04W 8/02; H04W 36/0016; H04W 36/0061; H04W 36/30
See application file for complete search history.

(56) References Cited

U.S. PATENT DOCUMENTS

| | | | |
|---|---|---|---|
| 9,370,025 B1* | 6/2016 | Singh | H04W 36/08 |
| 10,117,139 B1* | 10/2018 | Shahi | H04W 36/30 |
| 11,064,414 B1* | 7/2021 | Oroskar | H04W 36/00835 |
| 2003/0054799 A1* | 3/2003 | Shin | H04J 13/0048 |
| | | | 455/411 |
| 2003/0087631 A1* | 5/2003 | Diachina | H04M 1/72457 |
| | | | 455/414.1 |
| 2004/0266393 A1* | 12/2004 | Zhao | H04W 48/20 |
| | | | 455/435.2 |
| 2007/0147317 A1* | 6/2007 | Smith | H04W 48/18 |
| | | | 370/338 |
| 2009/0023448 A1* | 1/2009 | Attar | H04W 36/0061 |
| | | | 455/436 |
| 2010/0173632 A1* | 7/2010 | Kitaji | H04W 36/00837 |
| | | | 455/436 |
| 2011/0044244 A1* | 2/2011 | Etemad | H04W 8/26 |
| | | | 370/328 |
| 2013/0295951 A1* | 11/2013 | Mach | H04W 36/32 |
| | | | 455/517 |

(Continued)

*Primary Examiner* — Barry W Taylor

(57) ABSTRACT

One or more computing devices, systems, and/or methods for implementing differentiated mobility schemes are provided. In an example, a communication device may be identified as being connected with a first base station. A selection criterion may be identified based upon a characteristic associated with the communication device. A mobility scheme may be selected from a set of mobility schemes based upon the selection criterion. One or more thresholds of the mobility scheme may be communicated to the communication device.

20 Claims, 11 Drawing Sheets

(56) References Cited

U.S. PATENT DOCUMENTS

| | | | |
|---|---|---|---|
| 2016/0073312 A1* | 3/2016 | Sridhar | H04W 48/16 370/235 |
| 2017/0318509 A1* | 11/2017 | Ruiz Avilés et al. | H04W 36/0085 |
| 2019/0150042 A1* | 5/2019 | Srivastava | H04W 36/14 455/436 |
| 2020/0008007 A1* | 1/2020 | Belghoul | H04W 4/50 |
| 2020/0128415 A1* | 4/2020 | Venkataraman | H04W 72/10 |
| 2020/0137673 A1* | 4/2020 | Shikari | H04W 72/048 |
| 2020/0351724 A1* | 11/2020 | Guo | H04W 36/12 |
| 2021/0029600 A1* | 1/2021 | Balan | H04W 36/00837 |
| 2021/0127303 A1* | 4/2021 | Yoon | H04B 17/309 |
| 2021/0144602 A1* | 5/2021 | Potharaju | H04W 36/00835 |
| 2021/0314826 A1* | 10/2021 | Chang | H04W 36/0079 |
| 2021/0352547 A1* | 11/2021 | Chang | H04W 76/27 |
| 2022/0030453 A1* | 1/2022 | Kumar | H04W 36/06 |
| 2022/0070747 A1* | 3/2022 | You | H04W 36/00837 |

* cited by examiner

DIFFERENTIATED MOBILITY SCHEMES AND NEIGHBOR LISTS

BACKGROUND

A communication device, such as a mobile phone, a smart watch, or any other device, may comprise communication functionality that may be capable of communicating with various types of communication networks and equipment. For example, the communication device may be capable of connecting to various types of wireless networks for communication. Different communication networks may have different operational characteristics, and thus may provide communication capabilities with differing latencies, data throughputs, reliabilities, etc. As a communication device travels through a region, such as where a user is driving with a mobile phone or is walking around a stadium with a smart watch, the communication device may switch between various communication networks. Since these communication networks may have different operational characteristics, the switching from one type of communication network to another type of communication network may result in the communication device experiencing inconsistent arrival of packets of data, differing latencies, differing throughput, and/or other changes that can affect an end user's experience. For example, the communication device may host an application that may be tailored to operate based upon relatively lower latency communication over a communication network, such as with a mobile edge computing (MEC) server. If the communication device switches to a communication network with relatively higher latency than a current communication network to which the communication device is connected, then the low latency application may experience operational issues and degraded performance.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
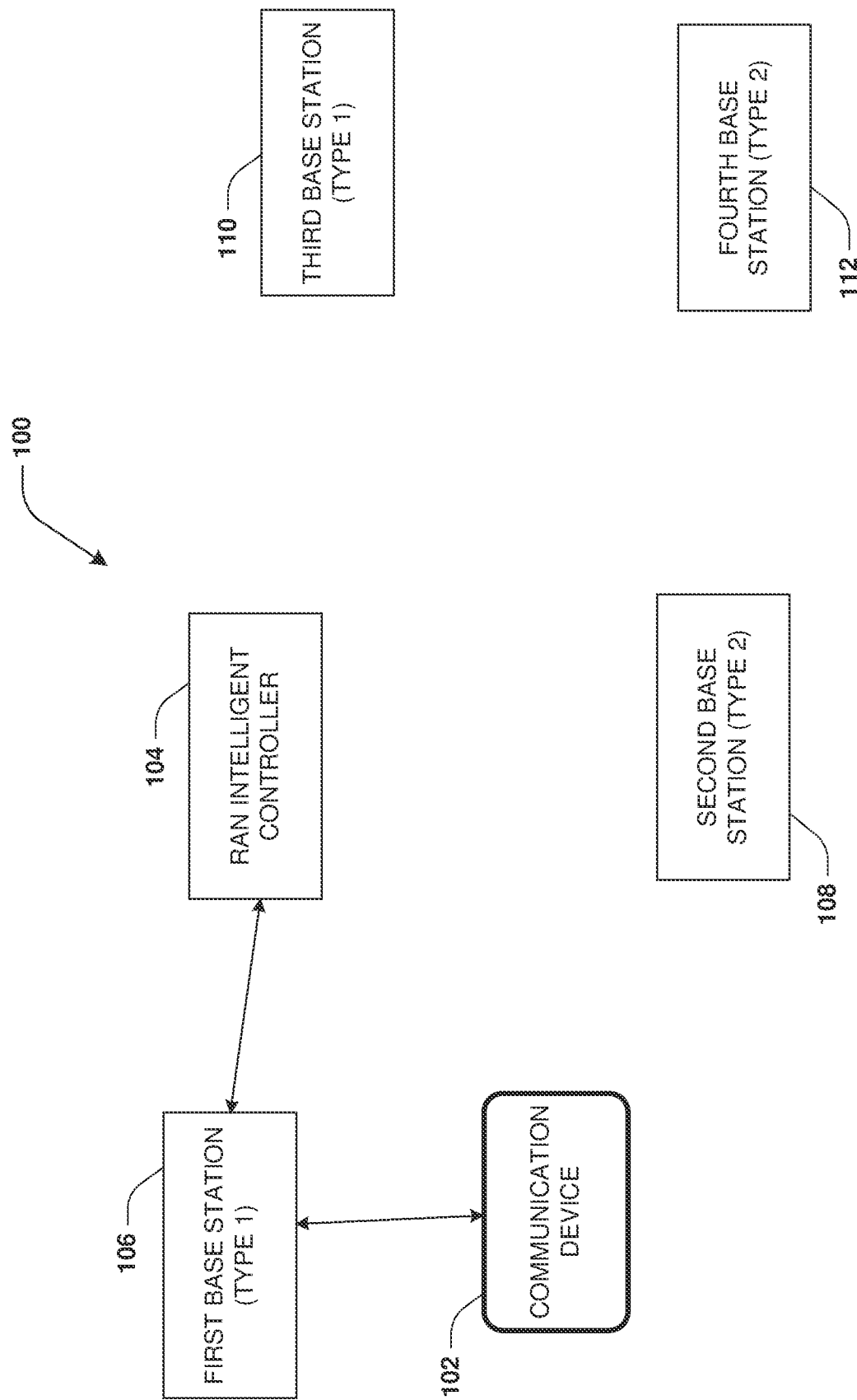
FIG. 1 is a diagram illustrating an example of a communication device communicating with one or more base stations.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for implementing differentiated mobility schemes and/or differentiated neighbor lists for communication devices are provided. Some communication networks, such as a 5G communication network or other types of communication networks, may be tailored for best effort data services for communication devices that connected to these types of communication networks. These types of communication networks may provide relatively lower latency than other communication networks such as an LTE communication network or other types of networks. The lower latency provided by these types of relatively lower latency communication networks enables the ability for communication devices to host applications that are tailored for low latency communication.

A relatively lower latency communication network, such as the 5G communication network, may not have comprehensive coverage for all possible locations that communication devices may travel. Accordingly, a communication network anchor of a communication network that provides relatively higher latency such as an LTE communication network anchor may be used by communication devices to provide relatively higher data rate throughput when the relatively lower latency communication network may not be available.

Various performance and network access continuity issues can result when a communication device switches from one type of communication network to a different type of communication network. For example, a communication device, such as a mobile device of a user that is driving along a highway, may host an application that accesses data and/or processing functionality from a remote device, such as a mobile edge computing (MEC) server or any other type of device. The communication device may connect to a relatively lower latency communication network such as by connecting to a 5G new radio (5G-NR) interface associated with a gNodeB base station. As the communication device travels along the highway, the communication device may travel further and further from the gNodeB base station. At some point in time, the communication device may determine that a communication connection with the gNodeB base station may be becoming weak enough that the communication device should switch to a different base station, such as to a closer base station with a stronger signal. When the communication device switches from the gNodeB base station to the different base station, inconsistent arrival of packets of data may occur that can result in a large latency change, jitter, etc. This may last anywhere from milliseconds to seconds, and can cause interrupted network access, which can cause the application to experience operational errors from being unable to access the MEC server.

Furthermore, if the communication device switches to a base station associated with a relatively higher latency communication network, then operation and performance of the application may be further diminished. For example, the communication device may transition from connecting to the gNodeB base station of the relatively lower latency 5G communication network to connecting to a relatively higher latency LTE communication network through an eNodeB base station. Not only will the communication device experience inconsistent arrival of packets and/or large latency, but the communication device will now be connected to the relatively higher latency LTE communication network, which can reduce the performance and operation of the application whose operation depends upon low latency communication, such as low latency communication with the MEC server. The network latency experienced by the application may be sensitive to radio signal fading, switching between different network legs, bursty traffic (e.g., a burst of network traffic in relation to available network throughput), and/or other factors.

The communication device may utilize a neighbor list to determine what base stations are available to utilize. The neighbor list may be generated by automatic neighbor relation (ANR) functionality. The neighbor list may comprise neighbor entries of neighbor base stations that the communication device can search for. For each neighbor entry within the neighbor list, the communication device may perform a measurement with respect to a base station listed within a neighbor entry to determine a reference signal received power (RSRP) associated with the base station, a reference signal received quality (RSRQ) associated with the base station, etc. Once the communication device has measured the RSRP, the RSRQ, and/or other metrics associated with the base stations listed within the neighbor entries of the neighbor list, the communication device may switch to communicating with a base station having a measured signal strength greater than measured signal strengths of other base stations within the neighbor entries of the neighbor list, such as a base station with a highest RSRP and/or RSRQ. Because there may be numerous neighbor entries within the neighbor list (e.g., 50 to 100 neighbor entries or more) created by the ANR functionality, the communication device may consume a significant amount of processing resources, power consumption, and time resulting in increased latency (e.g., hundreds of milliseconds of latency or more). The consumed processing resources and power, along with the increased latency, will also affect the performance and operation of the application.

Accordingly, as provided herein, differentiated mobility schemes and/or differentiated neighbor lists are provided to improve latency, reduce power consumption and processing resource consumption otherwise wasted by measuring too many base stations within a neighbor list, and improve the operation and performance of low latency applications executing on communication devices. In an embodiment, the differentiated mobile schemes may be implemented within a radio access network (RAN) intelligent controller. It may be appreciated that the differentiated mobile schemes may be implemented within any device connected to a communication network, and is not limited to RAN intelligent controllers.

The differentiated mobility schemes may be implemented to instruct a communication device to stay longer on a lower latency communication network, such as a 5G communication network, based upon various factors. For example, the factors may correspond to user characteristics (e.g., an indication that user may be executing a low latency application through the communication device), data flow characteristics (e.g., network traffic, throughput, and latency on available communication networks), quality of service characteristics (e.g., a quality of service for the application may specify a latency that is to be guaranteed for the application, such as where certain traffic of the application may be provided with preferential treatment compared to other traffic such as traffic of non-low latency applications), network slicing identification characteristics (e.g., network slices of logical and virtualized networks created to support specific applications, services, users, networks, etc.), latency characteristics, and/or a variety of other characteristics.

In an embodiment, the differentiated mobility schemes provide differentiated thresholds, such as measurement trigger thresholds and/or switching trigger thresholds. The thresholds are used to trigger when a communication device should measure base nodes within the neighbor list and/or when the communication device should switch from one base node to a different base node. The differentiated thresholds may be defined in a manner that will have the communication device stay on relatively lower latency communication networks longer if the communication device, such as an application on the communication device, would benefit from lower latency network access. If the lower latency network access would not benefit the communication device and/or applications executing thereon, then the differentiated threshold may prioritize other types of communication networks having stronger signal strength and/or data throughput.

The differentiated mobility schemes may also provide margin and/or hysteresis information to the communication device to use when determining whether to switch communication between base nodes. A differentiated mobility scheme may be implemented to disable the communication device from switching from a relatively lower latency communication network to a relatively higher latency communication network (e.g., switching from a 5G-NR interface to an LTE interface) if signal strength between the communication device and the relatively lower latency communication network may be sufficient even if a signal strength with the relatively higher latency communication network may be stronger. Furthermore, the differentiated mobility scheme may be implemented to prioritize the communication device to handover (switch over) from a base station associated with a relatively lower latency communication network to another base station associated with the relatively lower latency communication network (e.g., an inter-gNodeB base station handover) over handing over from the base station associated with the relatively lower latency communication network to a base station associated with the relatively higher latency communication network that might have better signal strength (e.g., a handover from a gNodeB base station of a 5G communication network to an eNodeB base station of an LTE communication network).

In an embodiment, differentiated neighbor list may be provided to tailor neighbor lists for lower latency applications. For example, a neighbor list associated with a communication device may be filtered based upon various filtering criteria to create a filtered neighbor list. The neighbor list may be filtered based upon user characteristics, data flow characteristics, quality of service characteristics, network slicing identification characteristics, distances to base stations, latency, etc. In another example, a black list of base stations that will introduce relatively high latency may be maintained and used to filter the neighbor list. So that the communication device does not automatically select higher latency communication networks merely because of a stronger signal, automatic neighbor relations (ARN) measurements by the communication device may be disabled. Also, differentiated measurement gaps for measuring communication devices within neighbor entries within the filtered neighbor list may be implemented.

Filtering the neighbor list results in the filtered neighbor list having a smaller number of neighbor entries that are tailored for lower latency. This is because neighboring entries associated with base stations having relatively higher latency are filtered out of (removed from) the neighbor list to create the filtered neighbor list. In this way, the communication device merely measures the base stations of those neighbor entries within the filtered neighbor list instead of the longer list of neighbor entries within the neighbor list. This may reduce power consumption, processing resource consumption, and/or time that would result in higher network latency for the communication device. Furthermore, the thresholds provided by the differentiated mobility schemes will further reduce latency and improve performance of the communication device and/or applications executing on the communication device that can benefit from lower network latency because the thresholds are tailored to keep the communication device on relatively lower latency communication networks for longer periods of time than if the differentiated mobility schemes were not implemented.

FIG. 1 illustrates a system 100 for which differentiated mobility schemes and differentiated neighbor lists may be implemented. A communication device 102 may comprise networking components and communication functionality configured to establish communication connections to base stations for communicating over communication networks. For example, the communication device 102 may comprise a cellular device, a phone, a smart watch, an IoT device, a vehicle computing device with communication functionality, or a device capable of communicating over a communication network such as an LTE communication network, a 4G communication network, a 5G communication network, and/or a wide variety of other types of communication networks.

The communication device 102 may be traveling through a region that has a first base station 106, a second base station 108, a third base station 110, a fourth base station 112, and/or other base stations. The first base station 106 and the third base station 110 may have a first base station type, such as where the first base station 106 and the third base stations 110 are gNodeB base stations having a 5G base station type or any other base station type. The second base station 108 and the fourth base station 112 may have a second base station type such as where the second base station 108 and the fourth base station 112 are eNodeB base stations having an LTE base station type or any other base station type.

The system 100 may comprise a radio access network (RAN) intelligent controller 104. The RAN intelligent controller 104 or any other device with communication functionality may be configured to implement differentiated mobility schemes and/or differentiated automatic neighbor relation lists based upon various factors such as user characteristics, data flow characteristics, quality of service characteristics, network slicing identification characteristics, latency, distances of base stations, etc. For example, the RAN intelligent controller 104 may identify the communication device 102 as currently being connected to the first base station 106. Based upon one or more selection criteria, the RAN intelligent controller 104 may select a mobility scheme from a set of mobility schemes. The RAN intelligent controller 104 may provide one or more thresholds of the mobility scheme to the communication device 102, such as through the first base station 106. The communication device 102 may utilize the one or more thresholds to determine when to measure other base stations.

The communication device 102 may utilize the one or more thresholds to determine when and/or whether to switch from communicating with the first base station 106 to communicating with another base station. The thresholds may be defined in a manner that keeps the communication device 102 on lower latency communication networks longer, such as to keep the communication device 102 connected to the first base station 106 longer than the communication device 102 otherwise would. Also, the thresholds may be defined to have the communication device 102 perform a handover (switching from one base station to another base station) from the first base station 106 to the third bases station 110 as opposed to the second base station 108 or the fourth base station 112. This is because the first base station type of the first base station 106 and the third base station 110, such as 5G base station type associated with a 5G communication network, may provide relatively lower latency that could improve operation of an application hosted by the communication device 102 compared to the second base station type of the second base station 108 and the fourth base station 112, such as an LTE base station type associated with an LTE communication network, that may have relatively higher latency.

The RAN intelligent controller 104 may be configured to identify a neighbor list associated with the communication device 102. The RAN intelligent controller 104 may filter the neighbor list based upon one or more filtering criteria to generate a filtered neighbor list. The RAN intelligent controller 104 may provide the filtered neighbor list to the communication device 102, such as through the first base station 106, so that the communication device 102 can consider and measure a smaller number of base stations within the filtered neighbor list. This will reduce latency, processing resources, and power consumption otherwise wasted in measuring a larger number of base stations that may include base stations that would introduce undesirably high latency. In this way, the RAN intelligent controller 104 may implement differentiated mobility schemes and/or differentiated neighbor lists to reduce the latency experienced by the communication device 102 in order to improve the operation of low latency applications executing on the communication device 102.

Figure 2:
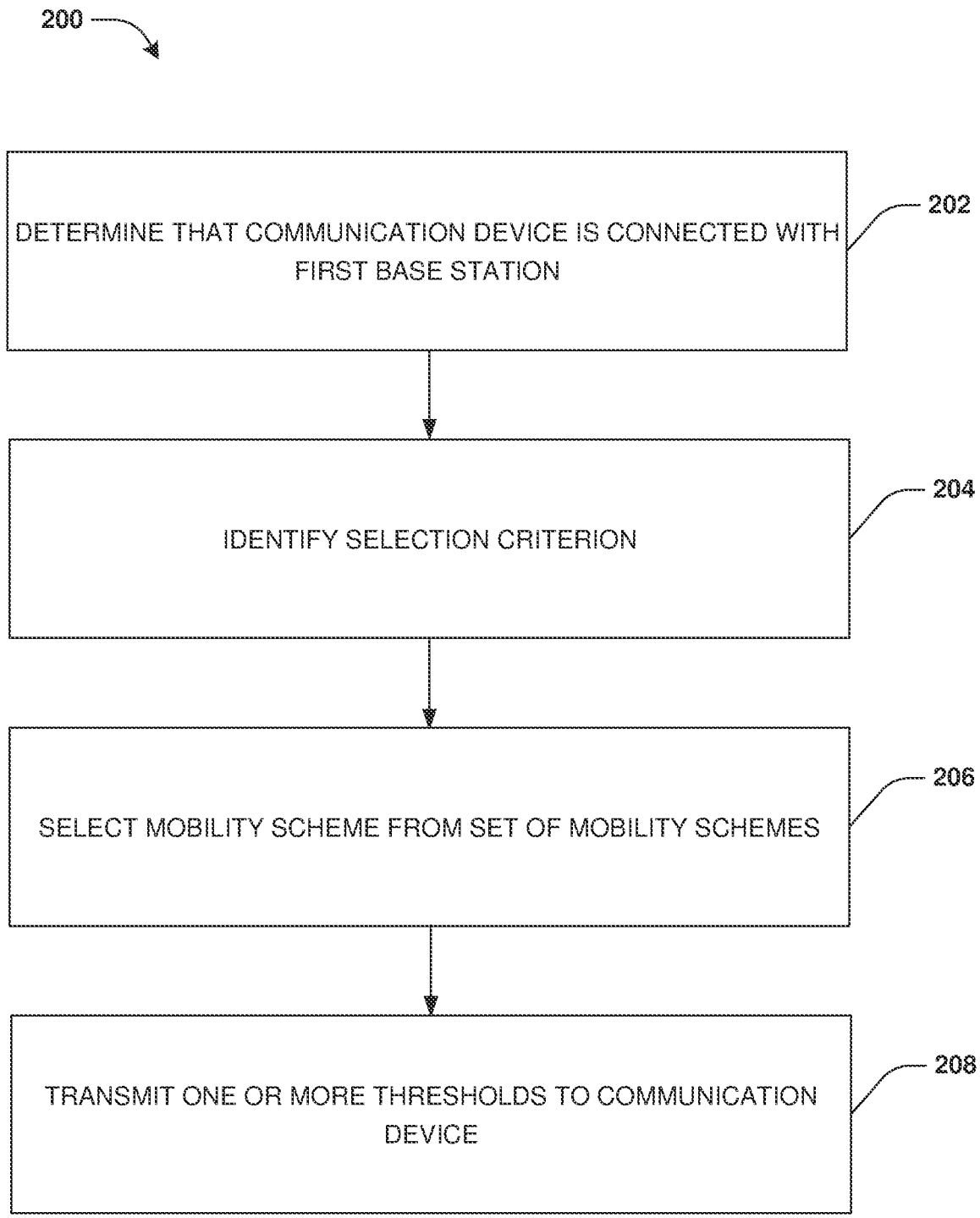
FIG. 2 is a flow chart illustrating an example method for implementing differentiated mobility schemes for communication devices using one or more thresholds.
Figure 3:
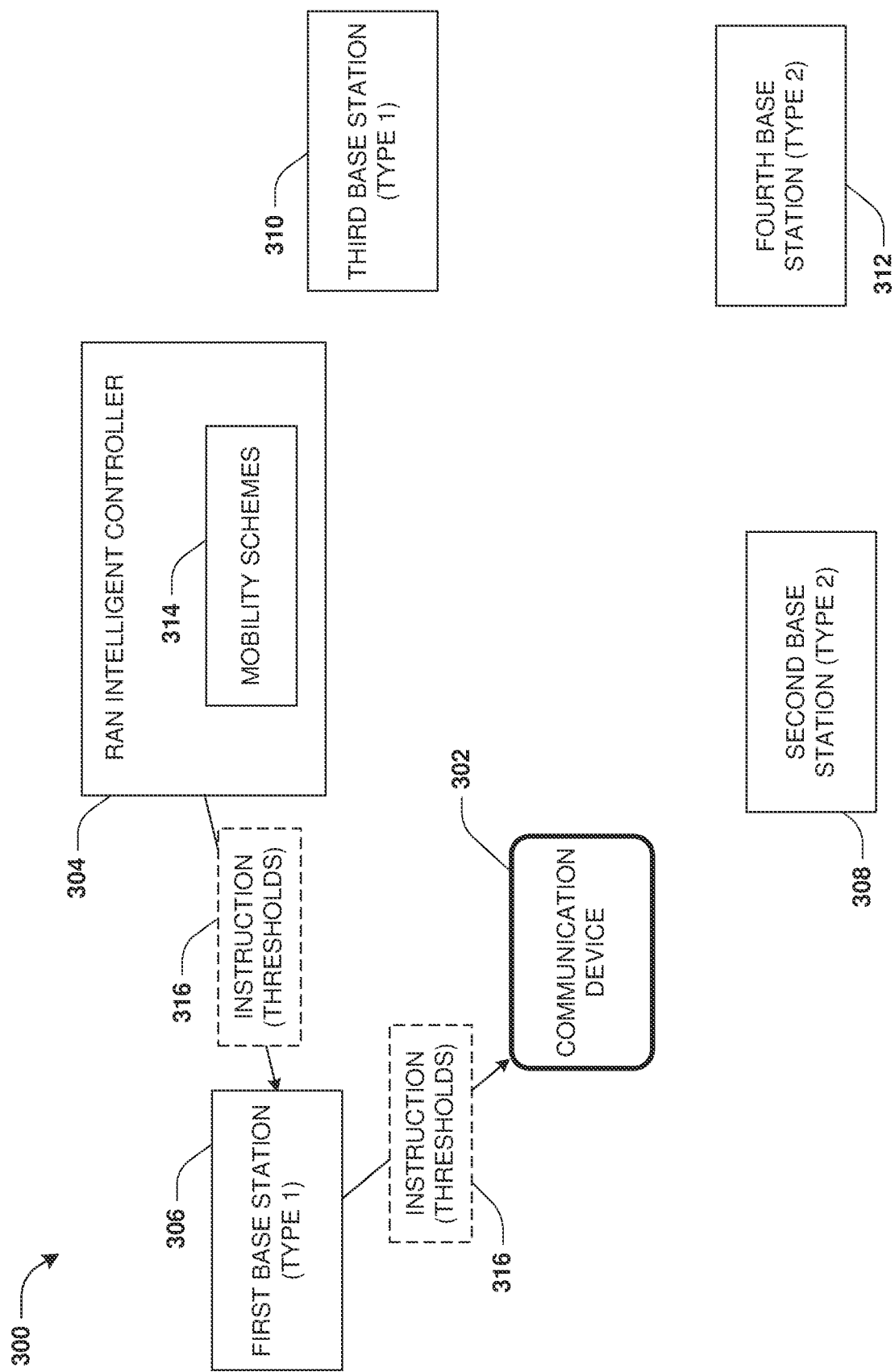
FIG. 3 is a diagram illustrating an example scenario associated with implementing differentiated mobility schemes for communication devices using one or more thresholds.

One embodiment of implementing differentiated mobility schemes is illustrated by an exemplary method 200 of FIG. 2 and is further described in conjunction with system 300 of FIG. 3. In an embodiment, a device, such as a RAN intelligent controller 304 or any other device with communication and/or processing capabilities, may define mobility schemes 314. The mobility schemes 314 may be defined with thresholds that can be used by communication devices, such as communication device 302, for triggering measurement of base stations and/or for triggering switching from communication with one base station to another base station.

In an embodiment, the differentiated mobility schemes and/or differentiated thresholds may be associated with different types of base stations. For example, a first mobility scheme with a first set of thresholds may be defined for a first base station type, such as a 5G base station type or any other base station type (e.g., a base station type associated with a relatively lower latency communication network). A second mobility scheme with a second set of thresholds may be defined for a second base station type, such as an LTE base station type or any other base station type (e.g., a base station type associated with a relatively higher latency communication network). In an embodiment, each mobility scheme may be associated with one or more characteristic values corresponding to user characteristics, data flow characteristics, quality of service characteristics, network slicing identification characteristics, latency threshold characteristics, distance characteristics, etc. In this way, characteristics associated with communication devices may be used as selection criterion for selecting a particular mobility scheme that is applicable to a current communication scenario of a particular communication device.

In an embodiment, the mobility schemes 314 may be defined to prioritize handovers between base stations having the first base station type compared to handovers from a base station having the first base station type to another base station having a second base station type. This is done in order to prioritize the communication device 302 to stay on lower latency communication networks associated with the first base station type. The mobility schemes 314 may be defined with other information, such as margins, hysteresis information, and/or other information that may be used to determine whether to measure base stations and/or switch to particular base stations. In an example, this information (e.g., margins and hysteresis information) may correspond to handover triggers for intra frequency, inter frequency, intra-RAT (radio access technologies), and inter-RAT (e.g., handover between LTE and 5G-NR) handovers. For example, this information such as RSRP thresholds, RSRQ thresholds, timers, and hysteresis may be used to search for potential handover base stations (cells), to perform a handover to a base station (cell), and/or to stop searching for a base station (cell).

In an embodiment, the communication device 302 may be traveling through a region that has a first base station 306 having a first base station type (e.g., the 5G base station type), a second base station 308 having a second base station type (e.g., the LTE base station type), a third base station 310 having the first base station type, and a fourth base station 112 having the second base station type. During operation 202 of method 200, a determination may be made that the communication device 302 is connected over a first communication connection to the first base station 306 having the first base station type. In an embodiment, the determination may be made by the RAN intelligent controller 304 or other device implementing differentiated mobility schemes. The RAN intelligent controller 304 may identify one or more characteristics associated with the communication device 302, such as a user characteristic (e.g., a characteristic of an application on a user device), a data flow characteristic (e.g., throughput, latency, traffic flow of data associated with communication networks and communication devices, etc.), a quality of service characteristic (e.g., a latency guaranteed for an application), a network slicing identification characteristic, a latency characteristic (e.g., current latency, latency expected on a communication network of a neighbor base station, etc.), a location/distance characteristic (e.g., distance to a neighbor base station), etc.

During operation 204 of method 200, selection criteria may be identified, such as by the RAN intelligent controller 304 or other device implementing differentiated mobility schemes, based upon the one or more characteristics associated with the communication device 302. In an example, if the one or more characteristics indicate that the communication device 302 is executing an application having a specified latency below a threshold (a low latency application/device), then a selection criteria tailored to select mobility schemes that would keep the communication device 302 on a lower latency communication network longer may be identified. If the one or more characteristics indicate that the communication device 302 is not executing an application having a specified latency below the threshold, then a selection criteria tailored to select mobility schemes that would prioritize other factors such as throughput, signal strength, etc. may be identified.

During operation 206 of method 200, a mobility scheme may be selected, such as by the RAN intelligent controller 304 or other device implementing differentiated mobility schemes, from the mobility schemes 314 using the selection criteria. In an example, the selection criteria may be used to select the mobility scheme based upon the mobility scheme being tailored to prioritize keeping the communication device 302 on relatively lower latency communication networks longer because the selection criteria is based upon the communication device 302 hosting the application having the specified latency below the threshold.

During operation 208 of method 200, an instruction 316 comprising one or more thresholds of the mobility scheme are transmitted, such as by the RAN intelligent controller 304 or other device implementing differentiated mobility schemes, to the communication device 302 such as through the first base station 306 to the communication device 302. In an embodiment, the instruction 316 comprises a measurement trigger threshold for the communication device 302 to utilize for triggering a measurement of one or more neighbor base stations, such as the second base station 308, the third base station 310, the fourth base station 312, etc. For example, a measurement trigger threshold may correspond to RSRP thresholds, RSRQ thresholds, etc., and thus time durations of measurements reported by the communication device 302 are evaluated to determine whether the time durations of measurements are above or below such thresholds. In response to the measurement trigger threshold being triggered, the communication device 302 may perform a measurement, such as by measuring signal strength, of a corresponding base station.

In an embodiment, the instruction 316 comprises a switching trigger threshold for the communication device 302 to utilize for triggering a handover to switch from communicating with the first base station 306 to communicating with a different base station. For example, if the measurement exceeds the switching trigger threshold, then the communication device 302 may switch to communicating with the third base station 310 associated with the relatively lower latency communication network as opposed to the second base station 308 associated with the relatively higher latency communication network even though there may be a stronger signal with respect to the second base station 308 compared to the third base station 310.

In an embodiment, the instruction 316 may comprise other information. For example, the instruction 316 may comprise margin information of the mobility scheme, which may be used by the communication device 302 to determine when and whether to switch to communicating with a different base station. In another example, the instruction 316 may comprise hysteresis information of the mobility scheme, which may be used by the communication device 302 to determine when and whether to switch to communicating with a different base station. In another example, the instruction 316 may instruct the communication device 302 to disable switching to a base station, such as the second base station 308 and the fourth base station 312, based upon the base station having the second base station type associated with the relatively higher latency communication network and based upon a signal strength of the communication connection with the first base station 306 exceeding a threshold signal strength. That is, so long as the signal strength between the communication device 302 and the first base station 306 is strong enough, then the communication device 302 may refrain from switching to communicating with the second base station 308 that may otherwise provide a stronger signal strength.

In another example, the instruction 316 may instruct the communication device 302 to refrain from releasing the communication connection to the first base station 306 notwithstanding the communication device 302 being within a second base station type anchor zone (e.g., an LTE anchor zone of the second base station 308 having the second base station type such as the LTE base station type). In another example, the instruction 316 may instruct the communication device 302 to directly handover from the first base station 306 having the first base station type to the third base station 310 having the first base station type without control from a second base station type anchor, such as the second base station 308 having the second base station type.

Figure 4:
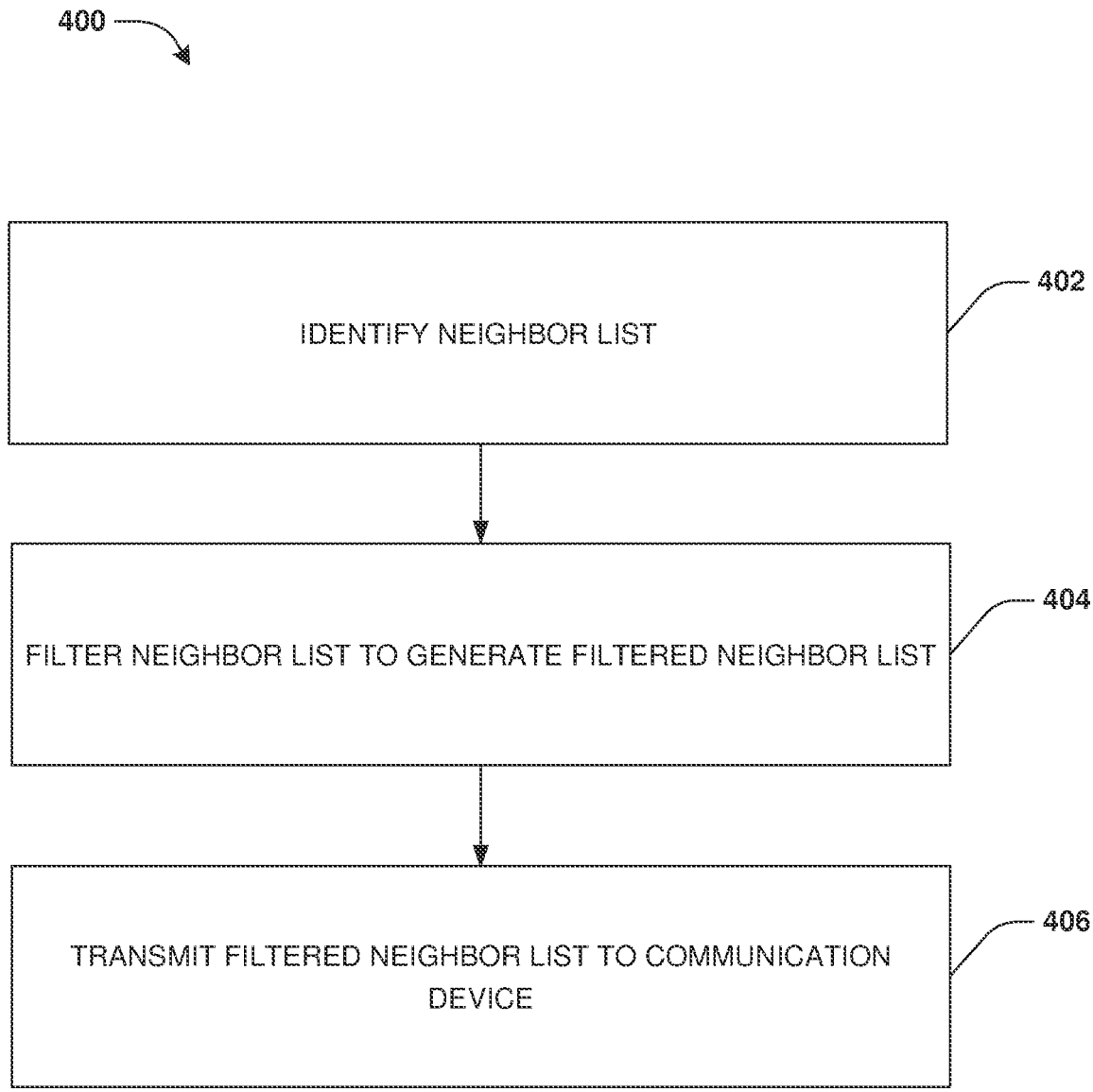
FIG. 4 is a flow chart illustrating an example method for implementing neighbor lists for communication devices by filtering a neighbor list.
Figure 5:
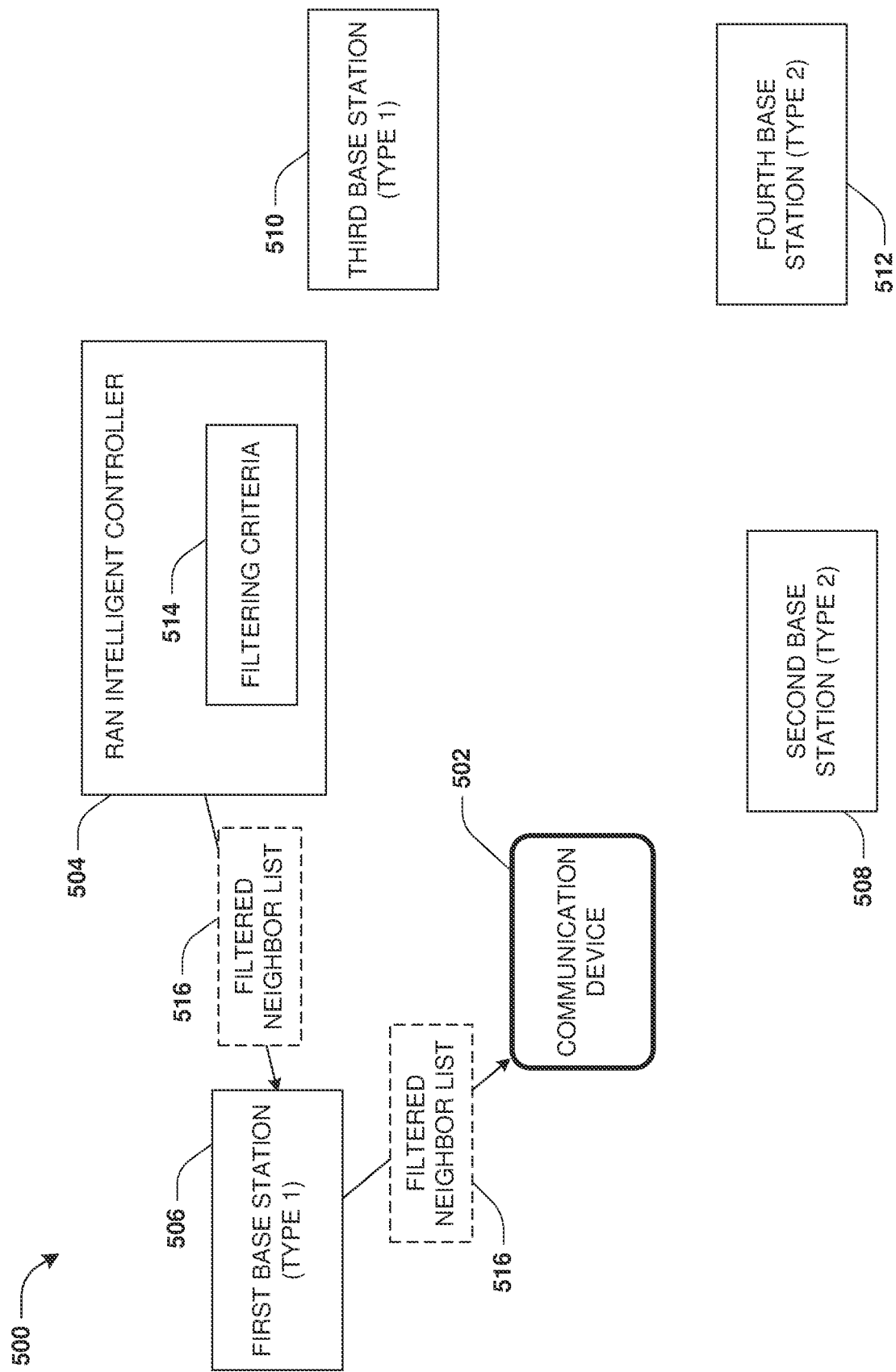
FIG. 5 is a diagram illustrating an example scenario associated with implementing neighbor lists for communication devices by filtering a neighbor list.

One embodiment of implementing differentiated neighbor lists is illustrated by an exemplary method 400 of FIG. 4 and is further described in conjunction with system 500 of FIG. 5. In an embodiment, a device, such as a RAN intelligent controller 504 or any other device with communication and/or processing capabilities, may implement differentiated neighbor lists. A communication device 502 may be connected to a first base station 506 having a first base station type. The communication device 502 may be located within a region at which other base stations are located, such as a second base station 508 having a second base station type, a third base station 510 having the first base station type, a fourth base station 512 having the second base station type, etc. In an embodiment, the first base station type may correspond to a relatively lower latency communication network such as a 5G communication network and the second base station type may correspond to a relatively higher latency communication network such as an LTE communication network.

The RAN intelligent controller 504 may maintain filtering criteria 514 used to filter neighbor lists associated with communication devices. The filtering criteria 514 may correspond to a user characteristic, a data flow characteristic, a quality of service characteristic, a network slicing identification characteristic, distances to base stations, latencies of base stations, and/or other characteristics that can be used to filter neighbor entries from neighbor lists. In an embodiment, the RAN intelligent controller 504 may maintain a black list of base stations having latencies above a threshold. The RAN intelligent controller 504 may utilize the black list of base stations as part of the filtering criteria 514 for filtering neighbor entries from neighbor lists. In an embodiment, the RAN intelligent controller 504 may disable communication devices from performing automatic neighboring relations list measurements so that the communication devices may instead implement filtered neighbor lists provided by the RAN intelligent controller 504 to the communication devices.

During operation 402 of method 400, a neighbor list associated with the communication device 502 may be identified, such as by the RAN intelligent controller 504 or other device implementing differentiated neighbor lists. The neighbor list may comprise neighbor entries of base stations available to the communication device 502 for connecting to for communication over communication networks associated with the base stations. During operation 404 of method 400, the neighbor list is filtered based upon the filtering criteria 514 to generate a filtered neighbor list 516. In an embodiment of filtering the neighbor list, a latency filtering criterion may be used to remove neighbor entries from the neighbor list based upon the neighbor entries corresponding to base stations having latencies above a threshold latency. In this way, the filtered neighbor list 516 may comprise a list of base stations having relatively lower latencies because relatively higher latency base stations may be removed from the neighbor list, in an example.

During operation 406 of method 400, the filtered neighbor list 516 may be transmitted to the communication device 502, such as through the first base station 506 by the RAN intelligent controller 504. The communication device 502 may utilize the filtered neighbor list 516 for switching between base stations, such as by using the filtered neighbor list 516 to identify base stations within neighbor entries of the filtered neighbor list 516 to consider for measuring signal strength. The communication device 502 may be provided with differentiated measurement gaps for measuring base stations within the filtered neighbor list 516. The differentiated measurement gaps may correspond to a time duration during which the communication device 502 suspends communication with a serving base station (a serving cell) in order to measure inter frequency neighbors or other RAT neighbors. For low latency communication, the time duration that may be set for a timer to trigger such measurements may be smaller than a time duration for best effort data communication. In an example, a measurement gap may be disable so that the communication device 502 does not switch to a high latency network, such as LTE, and thus the communication device 502 may stay on 5G-NR.

Figure 6:
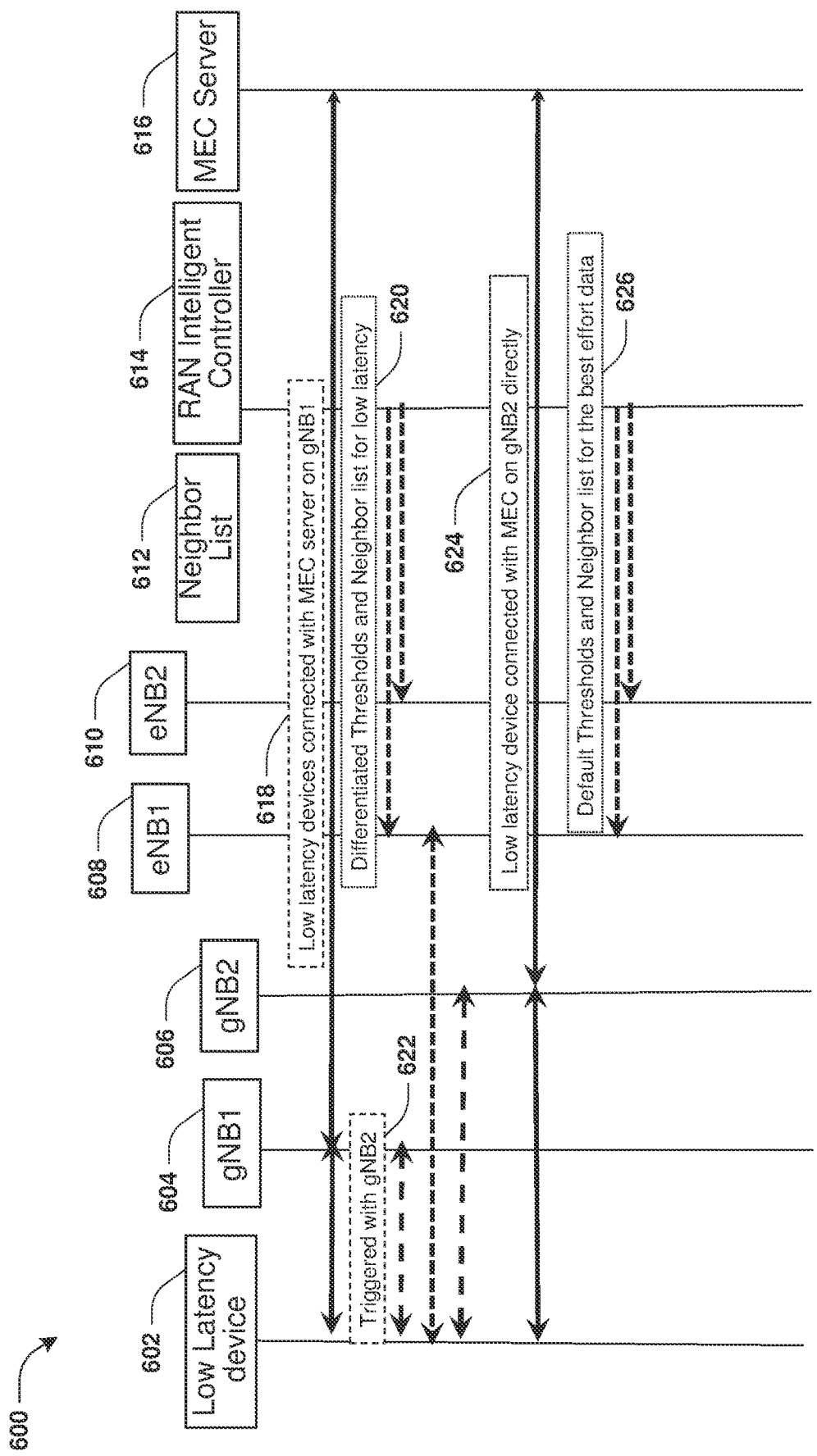
FIG. 6 is an illustration of an example of implementing differentiated mobility schemes and neighbor lists for a communication device.

FIG. 6 illustrates an example 600 of implementing differentiated mobility schemes and/or neighbor lists for a communication device. A low latency device 602 may connect 618 to a MEC server 616 through a gNodeB1 base station 604 associated with a 5G communication network that may provide relatively lower latency than other communication networks such as an LTE communication network associated with an eNodeB1 base station 608 and an eNodeB2 base station 610. A RAN intelligent controller 614 may provide 620 differentiated thresholds and/or a filtered neighbor list (e.g., a filtered version of a neighbor list 612 associated with the low latency device 602) to the low latency device 602 to utilize for triggering when to measure other base stations and/or when to switch to communicating with a different base station. The differentiated thresholds and/or the filtered neighbor list may be tailored to having the low latency device 602 connect to base stations associated with lower latency communication networks such as through the gNodeB1 base station 604 and a gNodeB2 base station 606. The low latency device 602 may be triggered to utilize the differentiated thresholds and/or the filtered neighbor list perform a handover 622 to switch to communicating 624 with the MEC server 616 through the gNodeB2 base station 604.

The RAN intelligent controller 614 may determine that the low latency device 602 is no longer executing any applications with low latency requirements. Accordingly, the RAN intelligent controller 614 may provide 626 default thresholds and/or the neighbor list 612 (or the filtered neighbor list) to the low latency device 602 to utilize for triggering when to measure other base stations and/or when to switch to communicating with a different base station.

According to some embodiments, a method is provided. The method includes determining that a communication device is connected over a first communication connection with a first base station having a first base station type; identifying a selection criterion based upon a characteristic associated with the communication device; selecting a mobility scheme from a set of mobility schemes based upon the selection criterion; and transmitting a measurement trigger threshold of the mobility scheme to the communication device to instruct the communication device to utilize the measurement trigger threshold to trigger a measurement of a second base station.

According to some embodiments, the method includes transmitting a switching trigger threshold of the mobility scheme to the communication device to instruct the communication device to switch from communicating with the first base station to communicating with the second base station over a second communication connection in response to the measurement exceeding the switching trigger threshold.

According to some embodiments, the method includes defining the mobility scheme with a set of thresholds defined for the first base station type and a second base station type.

According to some embodiments, the characteristic corresponds to at least one of a user characteristic, a data flow characteristic, a quality of service characteristic, or a network slicing identification characteristic.

According to some embodiments, the characteristic corresponds to a latency characteristic of an application having a specified latency below a threshold.

According to some embodiments, the method includes transmitting a margin of the mobility scheme to the communication device to instruct the communication device to utilize the margin to determine whether to switch to the second base station.

According to some embodiments, the method includes transmitting hysteresis information of the mobility scheme to the communication device to instruct the communication device to utilize the hysteresis information to determine whether to switch to the second base station.

According to some embodiments, the method includes transmitting an instruction to the communication device to disable switching to the second base station based upon the second base station having a second base station type and based upon a signal strength of the first communication connection with the first base station exceeding a threshold.

According to some embodiments, the method includes defining the mobility scheme to prioritize handovers between base stations having the first base station type over handovers from the first base station type to a second base station type.

According to some embodiments, the communication device switches from connecting to a mobile edge computing server through the first base station having the first base station type to connecting to the mobile edge computing server through the second base station having the first base station type.

According to some embodiments, the method includes instructing the communication device to refrain from releasing communication with the first base station while the communication device is within a second base station type anchor zone.

According to some embodiments, the method includes instructing the communication device to directly handover from the first base station having the first base station type to the second base station having the first base station type without control from a second base station type anchor.

According to some embodiments, a system is provided. The system comprises a processor coupled to memory, the processor configured to execute instructions to perform operations. The operations include identifying a neighbor list associated with a communication device connected over a communication connection with a first base station having a first base station type; filtering the neighbor list based upon a filtering criterion to generate a filtered neighbor list; and transmitting the filtered neighbor list to the communication device to utilize for switching between base stations.

According to some embodiments, the operations include filtering the neighbor list using a latency filtering criterion to remove a neighbor entry from the neighbor list based upon a latency of the neighbor entry.

According to some embodiments, the operations include maintaining a black list of base stations having latencies above a threshold; and utilizing the black list of base stations to filter the neighbor list.

According to some embodiments, the filtering criterion corresponds to at least one of a user characteristic, a data flow characteristic, a quality of service characteristic, a network slicing identification characteristic, distance, or latency.

According to some embodiments, the operations include disabling communication device based neighbor list measurements.

According to some embodiments, the operations include providing the communication device with differentiated measurement gaps for measuring base stations within the filtered neighbor list.

According to some embodiments, a non-transitory computer-readable medium storing instructions that when executed facilitate performance of operations, is provided. The operations include determining that a communication device is connected over a communication connection with a first base station having a first base station type; selecting a set of thresholds based upon at least one of a user characteristic, a data flow characteristic, a quality of service characteristic, a network slicing identification characteristic, or a latency characteristic associated with the communication device; and transmitting the set of thresholds to the communication device to instruct the communication device to utilize the set of thresholds for determining whether to switch to a second base station.

According to some embodiments, the operations include filtering an neighbor list associated with the communication device based upon a filtering criterion to generate a filtered neighbor list; and transmitting the filtered neighbor list to the communication device to utilize for switching between base stations.

Figure 7:
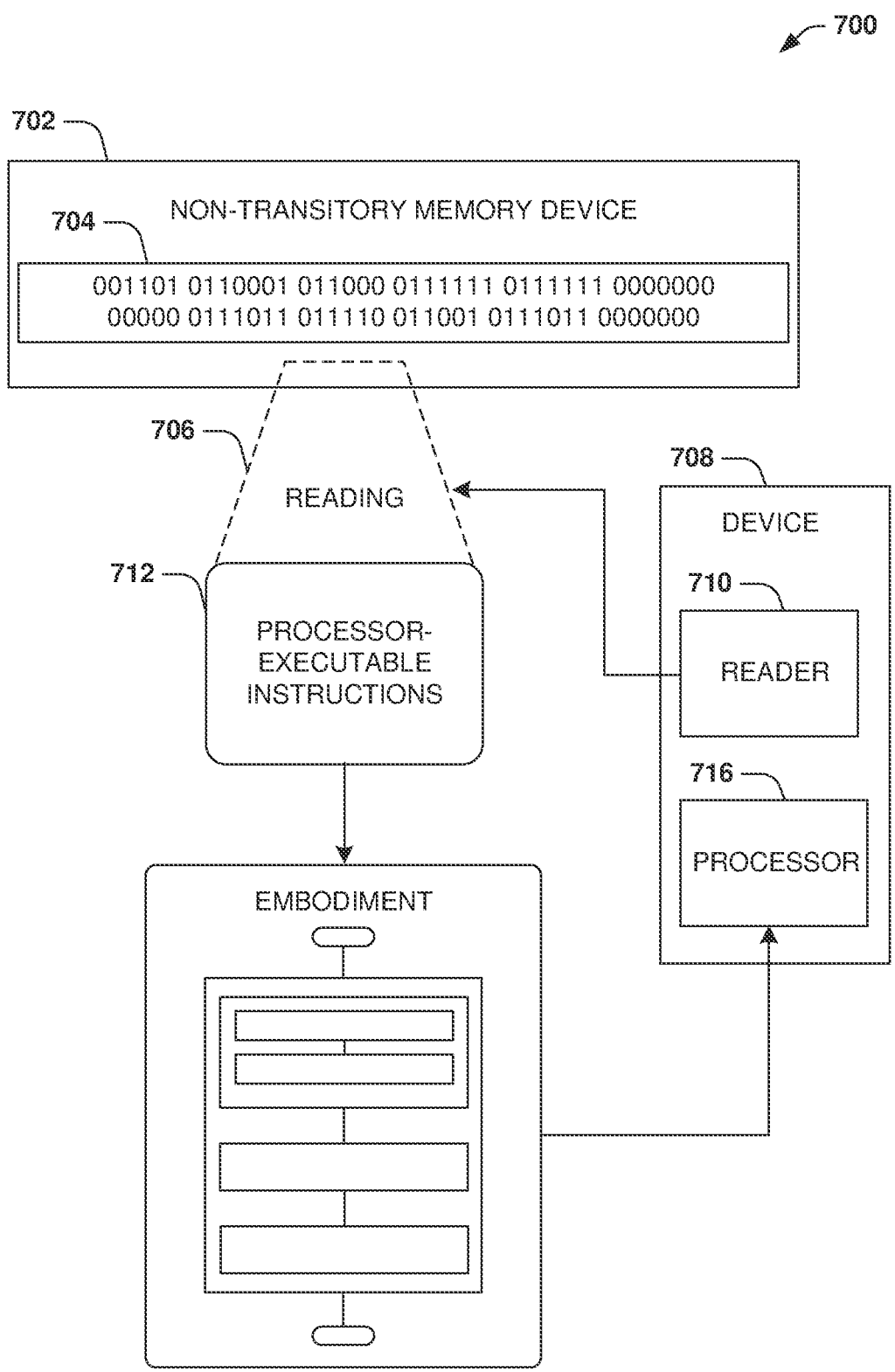
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 200 of FIG. 2 and/or at least some of the example method 400 of FIG. 4, for example. In some embodiments, the processor-executable instructions 712 are configured to cause implementation of a system, such as at least some of the example system 100 of FIG. 1, at least some of the example system 300 of FIG. 3 and/or at least some of the example system 500 of FIG. 5, for example.

Figure 8:
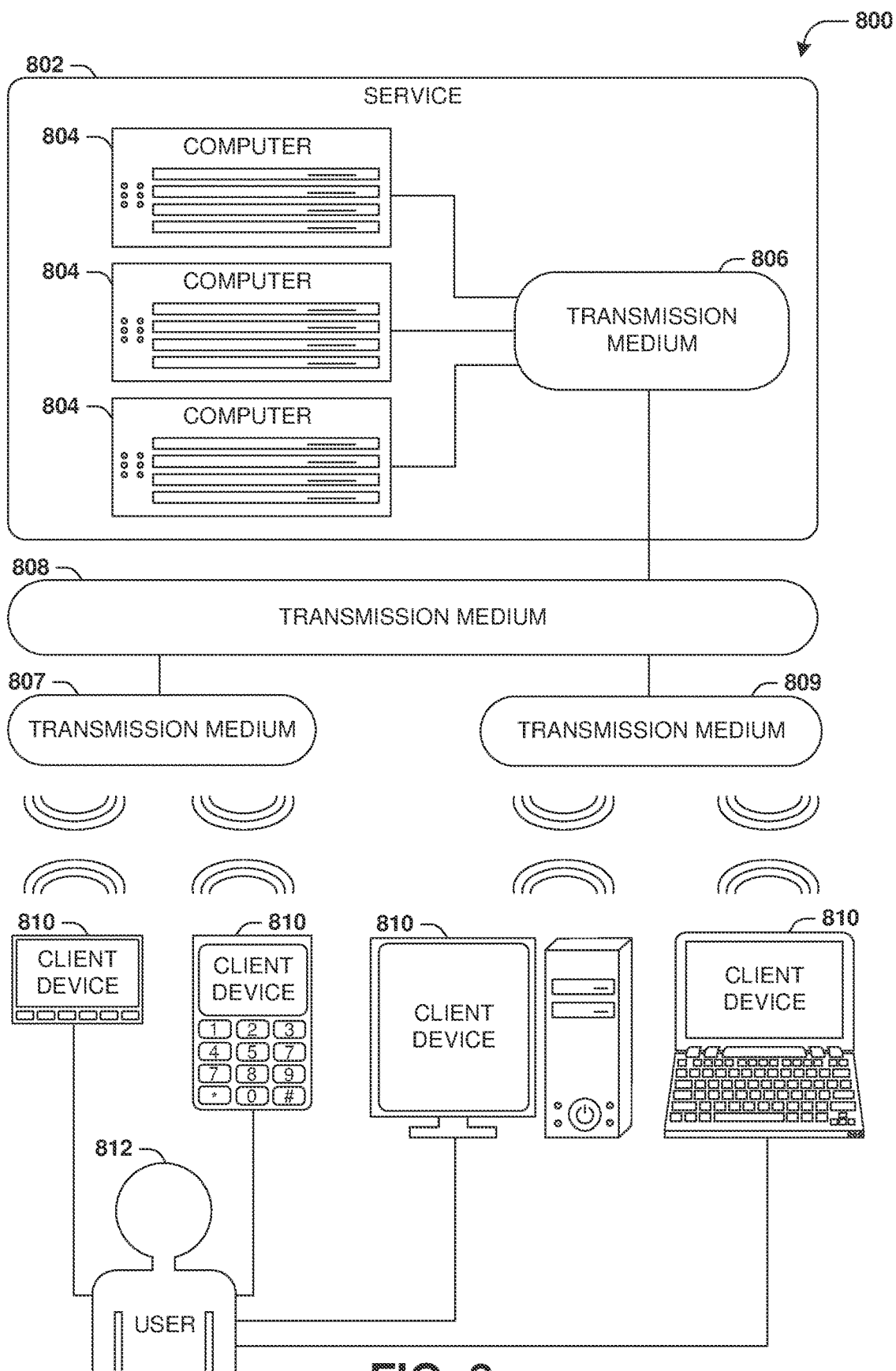
FIG. 8 is an illustration of example networks that may utilize and/or implement at least a portion of the techniques presented herein.

FIG. 8 is an interaction diagram of a scenario 800 illustrating a service 802 provided by a set of computers 804 to a set of client devices 810 via various types of transmission mediums. The computers 804 and/or client devices 810 may be capable of transmitting, receiving, processing, and/or storing many types of signals, such as in memory as physical memory states.

The computers 804 of the service 802 may be communicatively coupled together, such as for exchange of communications using a transmission medium 806. The transmission medium 806 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 802.

Likewise, the transmission medium 806 may comprise one or more sub-networks, such as may employ different architectures, may be compliant or compatible with differing protocols and/or may interoperate within the transmission medium 806. Additionally, various types of transmission medium 806 may be interconnected (e.g., a router may provide a link between otherwise separate and independent transmission medium 806).

In scenario 800 of FIG. 8, the transmission medium 806 of the service 802 is connected to a transmission medium 808 that allows the service 802 to exchange data with other services 802 and/or client devices 810. The transmission medium 808 may encompass various combinations of devices with varying levels of distribution and exposure, such as a public wide-area network and/or a private network (e.g., a virtual private network (VPN) of a distributed enterprise).

In the scenario 800 of FIG. 8, the service 802 may be accessed via the transmission medium 808 by a user 812 of one or more client devices 810, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 810 may communicate with the service 802 via various communicative couplings to the transmission medium 808. As a first such example, one or more client devices 810 may comprise a cellular communicator and may communicate with the service 802 by connecting to the transmission medium 808 via a transmission medium 807 provided by a cellular provider. As a second such example, one or more client devices 810 may communicate with the service 802 by connecting to the transmission medium 808 via a transmission medium 809 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 804 and the client devices 810 may communicate over various types of transmission mediums.

Figure 9:
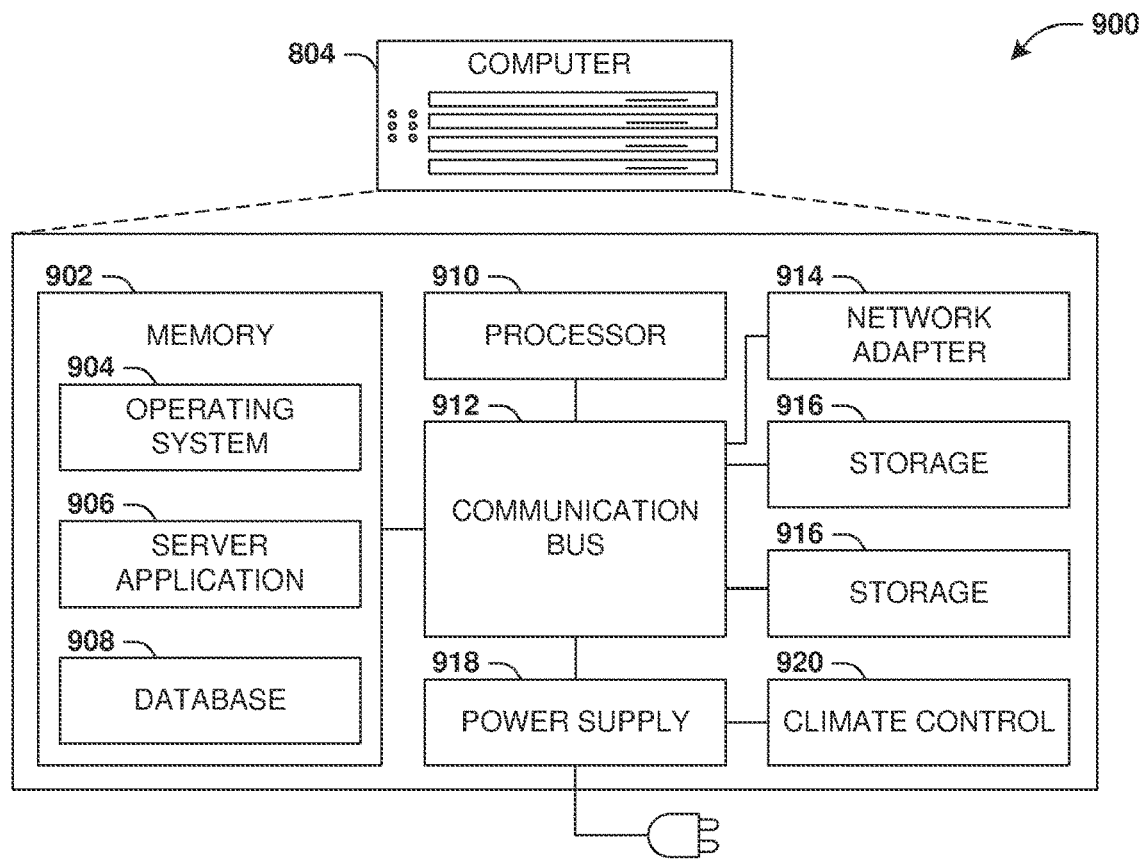
FIG. 9 is an illustration of a scenario involving an example configuration of a computer that may utilize and/or implement at least a portion of the techniques presented herein.

FIG. 9 presents a schematic architecture diagram 900 of a computer 804 that may utilize at least a portion of the techniques provided herein. Such a computer 804 may vary widely in configuration or capabilities, alone or in conjunction with other computers, in order to provide a service such as the service 802.

The computer 804 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The computer 804 may comprise memory 902 storing various forms of applications, such as an operating system 904; one or more computer applications 906; and/or various forms of data, such as a database 908 or a file system. The computer 804 may comprise a variety of peripheral components, such as a wired and/or wireless network adapter 914 connectible to a local area network and/or wide area network; one or more storage components 916, such as a hard disk drive, a solid-state storage device (SSD), a flash memory device, and/or a magnetic and/or optical disk reader.

The computer 804 may comprise a mainboard featuring one or more communication buses 912 that interconnect the processor 910, the memory 902, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 912 may interconnect the computer 804 with at least one other computer. Other components that may optionally be included with the computer 804 (though not shown in the schematic architecture diagram 900 of FIG. 9) include a display; a display adapter, such as a graphical processing unit (GPU); input peripherals, such as a keyboard and/or mouse; and a flash memory device that may store a basic input/output system (BIOS) routine that facilitates booting the computer 804 to a state of readiness.

The computer 804 may operate in various physical enclosures, such as a desktop or tower, and/or may be integrated with a display as an "all-in-one" device. The computer 804 may be mounted horizontally and/or in a cabinet or rack, and/or may simply comprise an interconnected set of components. The computer 804 may comprise a dedicated and/or shared power supply 918 that supplies and/or regulates power for the other components. The computer 804 may provide power to and/or receive power from another computer and/or other devices. The computer 804 may comprise a shared and/or dedicated climate control unit 920 that regulates climate properties, such as temperature, humidity, and/or airflow. Many such computers 804 may be configured and/or adapted to utilize at least a portion of the techniques presented herein.

Figure 10:
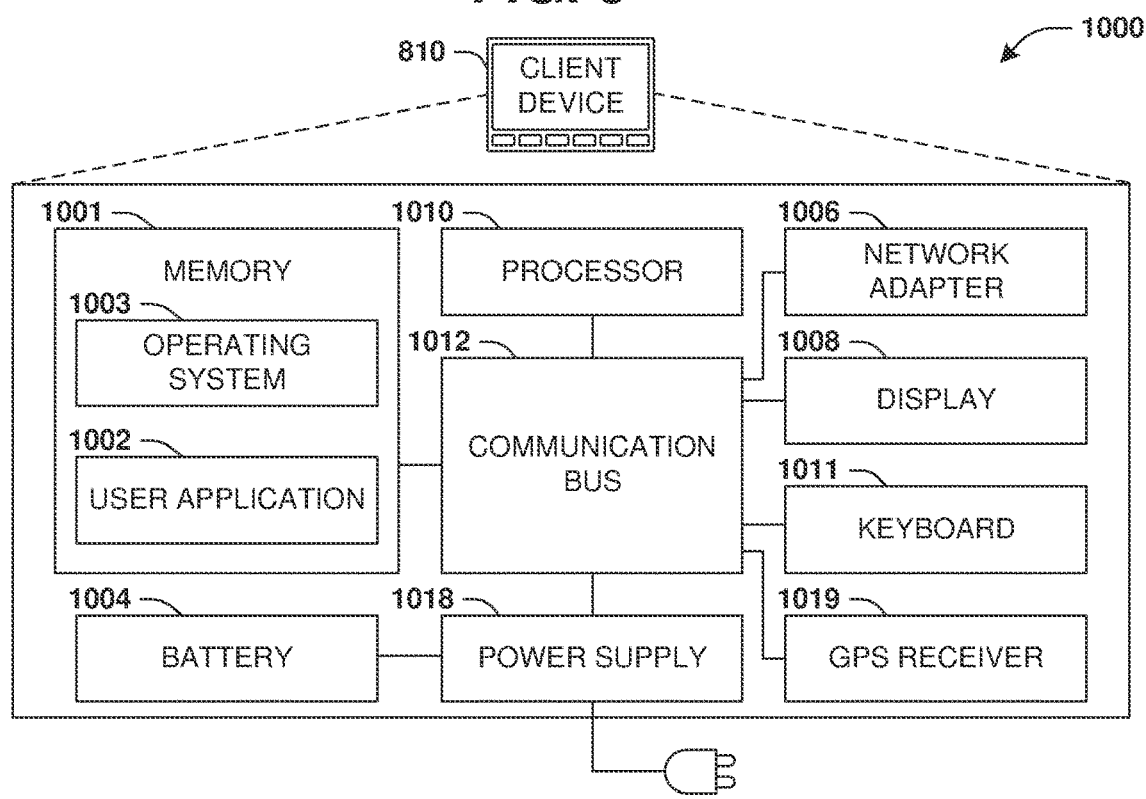
FIG. 10 is an illustration of a scenario involving an example configuration of a client that may utilize and/or implement at least a portion of the techniques presented herein.

FIG. 10 presents a schematic architecture diagram 1000 of a client device 810 whereupon at least a portion of the techniques presented herein may be implemented. Such a client device 810 may vary widely in configuration or capabilities, in order to provide a variety of functionality to a user such as the user 812. The client device 810 may be provided in a variety of form factors, such as a desktop or tower workstation; an "all-in-one" device integrated with a display 1008; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 810 may serve the user in a variety of roles, such as a workstation, kiosk, media player, gaming device, and/or appliance.

The client device 810 may comprise one or more processors 1010 that process instructions. The one or more processors 1010 may optionally include a plurality of cores; one or more coprocessors, such as a mathematics coprocessor or an integrated graphical processing unit (GPU); and/or one or more layers of local cache memory. The client device 810 may comprise memory 1001 storing various forms of applications, such as an operating system 1003; one or more user applications 1002, such as document applications, media applications, file and/or data access applications, communication applications such as web browsers and/or email clients, utilities, and/or games; and/or drivers for various peripherals. The client device 810 may comprise a variety of peripheral components, such as a wired and/or wireless network adapter 1006 connectible to a local area network and/or wide area network; one or more output components, such as a display 1008 coupled with a display adapter (optionally including a graphical processing unit (GPU)), a sound adapter coupled with a speaker, and/or a printer; input devices for receiving input from the user, such as a keyboard 1011, a mouse, a microphone, a camera, and/or a touch-sensitive component of the display 1008; and/or environmental sensors, such as a global positioning system (GPS) receiver 1019 that detects the location, velocity, and/or acceleration of the client device 810, a compass, accelerometer, and/or gyroscope that detects a physical orientation of the client device 810. Other components that may optionally be included with the client device 810 (though not shown in the schematic architecture diagram 1000 of FIG. 10) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 810 to a state of readiness; and a climate control unit that regulates climate properties, such as temperature, humidity, and airflow.

The client device 810 may comprise a mainboard featuring one or more communication buses 1012 that interconnect the processor 1010, the memory 1001, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 810 may comprise a dedicated and/or shared power supply 1018 that supplies and/or regulates power for other components, and/or a battery 1004 that stores power for use while the client device 810 is not connected to a power source via the power supply 1018. The client device 810 may provide power to and/or receive power from other client devices.

Figure 11:
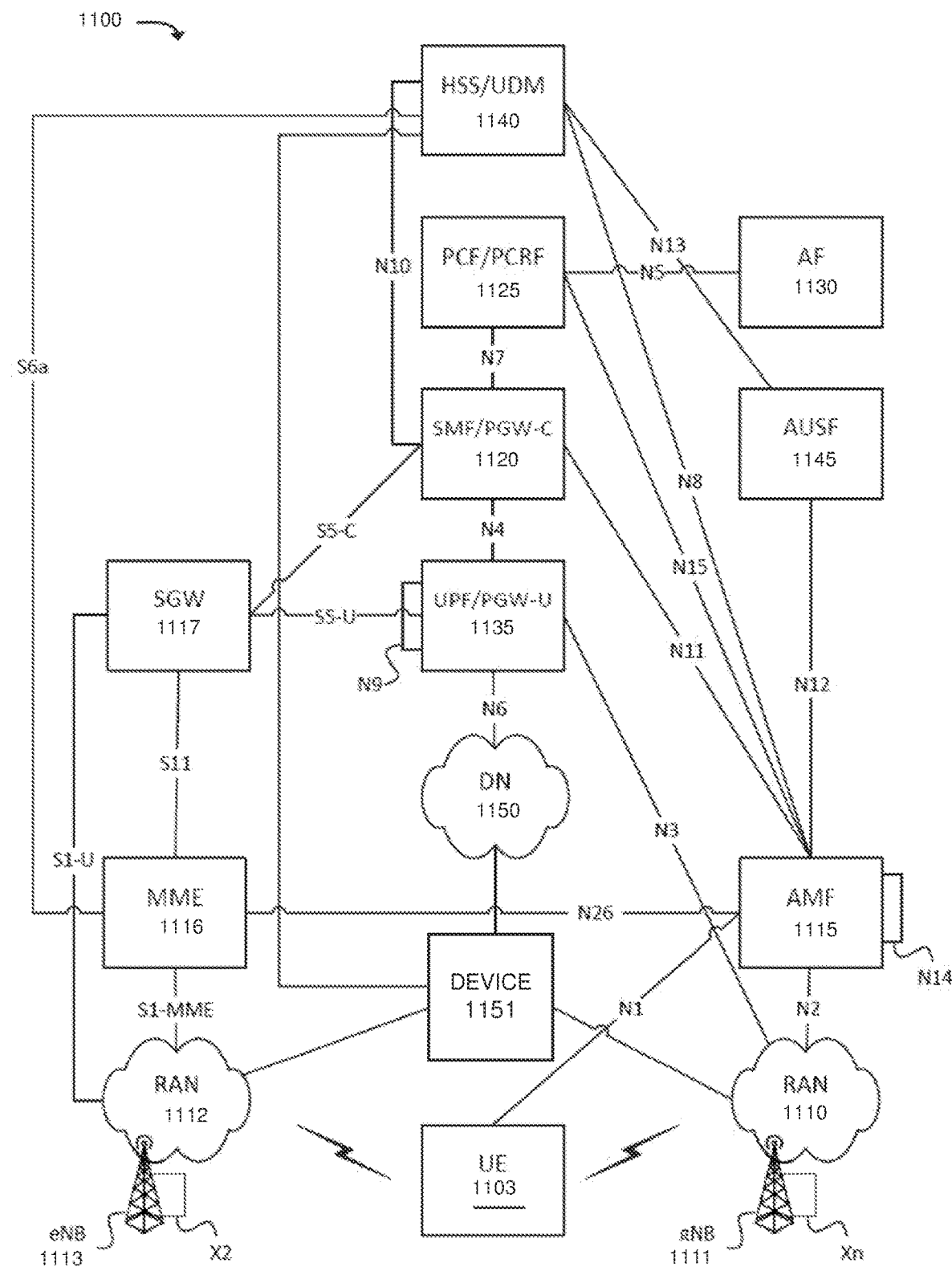
FIG. 11 is an illustration of an example environment in which at least a portion of the techniques presented herein may be utilized and/or implemented.

FIG. 11 illustrates an example environment 1100, in which one or more embodiments may be implemented. In some embodiments, environment 1100 may correspond to a Fifth Generation ("5G") network, and/or may include elements of a 5G network. In some embodiments, environment 1100 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1100 may include UE 1103, RAN 1110 (which may include one or more Next Generation Node Bs ("gNBs") 1111), RAN 1112 (which may include one or more one or more evolved Node Bs ("eNBs") 1113), and various network functions such as Access and Mobility Management Function ("AMF") 1115, Mobility Management Entity ("MME") 1116, Serving Gateway ("SGW") 1117, Session Management Function ("SMF")/Packet Data Network ("PDN") Gateway ("PGW")-Control plane function ("PGW-C") 1120, Policy Control Function ("PCF")/Policy Charging and Rules Function ("PCRF") 1125, Application Function ("AF") 1130, User Plane Function ("UPF")/PGW-User plane function ("PGW-U") 1135, Home Subscriber Server ("HSS")/Unified Data Management ("UDM") 1140, and Authentication Server Function ("AUSF") 1145. Environment 1100 may also include one or more networks, such as Data Network ("DN") 1150. Environment 1100 may include one or more additional devices or systems communicatively coupled to one or more networks (e.g., DN 1150), such as device 1151 corresponding to a voice command device, a communication device, an authentication service, a messaging service, a service, a client device capable of identifying users, a client device capable of authenticating users, etc.

The example shown in FIG. 11 illustrates one instance of each network component or function (e.g., one instance of SMF/PGW-C 1120, PCF/PCRF 1125, UPF/PGW-U 1135, HSS/UDM 1140, and/or 1145). In practice, environment 1100 may include multiple instances of such components or functions. For example, in some embodiments, environment 1100 may include multiple "slices" of a core network, where each slice includes a discrete set of network functions (e.g., one slice may include a first instance of SMF/PGW-C 1120, PCF/PCRF 1125, UPF/PGW-U 1135, HSS/UDM 1140, and/or 1145, while another slice may include a second instance of SMF/PGW-C 1120, PCF/PCRF 1125, UPF/PGW-U 1135, HSS/UDM 1140, and/or 1145). The different slices may provide differentiated levels of service, such as service in accordance with different Quality of Service ("QoS") parameters.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, etc. Alternatively and/or additionally, one or more of the devices of environment 1100 may perform one or more network functions described as being performed by another one or more of the devices of environment 1100. Devices of environment 1100 may interconnect with each other and/or other devices via wired connections, wireless connections, or a combination of wired and wireless connections. In some implementations, one or more devices of environment 1100 may be physically integrated in, and/or may be physically attached to, one or more other devices of environment 1100.

UE 1103 may include a computation and communication device, such as a wireless mobile communication device that is capable of communicating with RAN 1110, RAN 1112, and/or DN 1150. UE 1103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1103 may send traffic to and/or receive traffic (e.g., user plane traffic) from DN 1150 via RAN 1110, RAN 1112, and/or UPF/PGW-U 1135.

RAN 1110 may be, or may include, a 5G RAN that includes one or more base stations (e.g., one or more gNBs 1111), via which UE 1103 may communicate with one or more other elements of environment 1100. UE 1103 may communicate with RAN 1110 via an air interface (e.g., as provided by gNB 1111). For instance, RAN 1110 may receive traffic (e.g., voice call traffic, data traffic, messaging traffic, signaling traffic, etc.) from UE 1103 via the air interface, and may communicate the traffic to UPF/PGW-U 1135, and/or one or more other devices or networks. Similarly, RAN 1110 may receive traffic intended for UE 1103 (e.g., from UPF/PGW-U 1135, AMF 1115, and/or one or more other devices or networks) and may communicate the traffic to UE 1103 via the air interface.

RAN 1112 may be, or may include, a LTE RAN that includes one or more base stations (e.g., one or more eNBs 1113), via which UE 1103 may communicate with one or more other elements of environment 1100. UE 1103 may communicate with RAN 1112 via an air interface (e.g., as provided by eNB 1113). For instance, RAN 1110 may receive traffic (e.g., voice call traffic, data traffic, messaging traffic, signaling traffic, etc.) from UE 1103 via the air interface, and may communicate the traffic to UPF/PGW-U 1135, and/or one or more other devices or networks. Similarly, RAN 1110 may receive traffic intended for UE 1103 (e.g., from UPF/PGW-U 1135, SGW 1117, and/or one or more other devices or networks) and may communicate the traffic to UE 1103 via the air interface.

AMF 1115 may include one or more devices, systems, Virtualized Network Functions ("VNFs"), etc., that perform operations to register UE 1103 with the 5G network, to establish bearer channels associated with a session with UE 1103, to hand off UE 1103 from the 5G network to another network, to hand off UE 1103 from the other network to the 5G network, manage mobility of UE 1103 between RANs 1110 and/or gNBs 1111, and/or to perform other operations. In some embodiments, the 5G network may include multiple AMFs 1115, which communicate with each other via the N14 interface (denoted in FIG. 11 by the line marked "N14" originating and terminating at AMF 1115).

MME 1116 may include one or more devices, systems, VNFs, etc., that perform operations to register UE 1103 with the EPC, to establish bearer channels associated with a session with UE 1103, to hand off UE 1103 from the EPC to another network, to hand off UE 1103 from another network to the EPC, manage mobility of UE 1103 between RANs 1112 and/or eNBs 1113, and/or to perform other operations.

SGW 1117 may include one or more devices, systems, VNFs, etc., that aggregate traffic received from one or more eNBs 1113 and send the aggregated traffic to an external network or device via UPF/PGW-U 1135. Additionally, SGW 1117 may aggregate traffic received from one or more UPF/PGW-Us 1135 and may send the aggregated traffic to one or more eNBs 1113. SGW 1117 may operate as an anchor for the user plane during inter-eNB handovers and as an anchor for mobility between different telecommunication networks or RANs (e.g., RANs 1110 and 1112).

SMF/PGW-C 1120 may include one or more devices, systems, VNFs, etc., that gather, process, store, and/or provide information in a manner described herein. SMF/PGW-C 1120 may, for example, facilitate in the establishment of communication sessions on behalf of UE 1103. In some embodiments, the establishment of communications sessions may be performed in accordance with one or more policies provided by PCF/PCRF 1125.

PCF/PCRF 1125 may include one or more devices, systems, VNFs, etc., that aggregate information to and from the 5G network and/or other sources. PCF/PCRF 1125 may receive information regarding policies and/or subscriptions from one or more sources, such as subscriber databases and/or from one or more users (such as, for example, an administrator associated with PCF/PCRF 1125).

AF 1130 may include one or more devices, systems, VNFs, etc., that receive, store, and/or provide information that may be used in determining parameters (e.g., quality of service parameters, charging parameters, or the like) for certain applications.

UPF/PGW-U 1135 may include one or more devices, systems, VNFs, etc., that receive, store, and/or provide data (e.g., user plane data). For example, UPF/PGW-U 1135 may receive user plane data (e.g., voice call traffic, data traffic, etc.), destined for UE 1103, from DN 1150, and may forward the user plane data toward UE 1103 (e.g., via RAN 1110, SMF/PGW-C 1120, and/or one or more other devices). In some embodiments, multiple UPFs 1135 may be deployed (e.g., in different geographical locations), and the delivery of content to UE 1103 may be coordinated via the N9 interface (e.g., as denoted in FIG. 11 by the line marked "N9" originating and terminating at UPF/PGW-U 1135). Similarly, UPF/PGW-U 1135 may receive traffic from UE 1103 (e.g., via RAN 1110, SMF/PGW-C 1120, and/or one or more other devices), and may forward the traffic toward DN 1150. In some embodiments, UPF/PGW-U 1135 may communicate (e.g., via the N4 interface) with SMF/PGW-C 1120, regarding user plane data processed by UPF/PGW-U 1135.

HSS/UDM 1140 and AUSF 1145 may include one or more devices, systems, VNFs, etc., that manage, update, and/or store, in one or more memory devices associated with AUSF 1145 and/or HSS/UDM 1140, profile information associated with a subscriber. AUSF 1145 and/or HSS/UDM 1140 may perform authentication, authorization, and/or accounting operations associated with the subscriber and/or a communication session with UE 1103.

DN 1150 may include one or more wired and/or wireless networks. For example, DN 1150 may include an Internet Protocol ("IP")-based PDN, a wide area network ("WAN") such as the Internet, a private enterprise network, and/or one or more other networks. UE 1103 may communicate, through DN 1150, with data servers, other UEs UE 1103, and/or to other servers or applications that are coupled to DN 1150. DN 1150 may be connected to one or more other networks, such as a public switched telephone network ("PSTN"), a public land mobile network ("PLMN"), and/or another network. DN 1150 may be connected to one or more devices, such as content providers, applications, web servers, and/or other devices, with which UE 1103 may communicate.

The device 1151 may include one or more devices, systems, VNFs, etc., that perform one or more operations described herein. For example, the device 1151 detect voice commands, facilitate the creation of accounts, and/or perform actions associated with the accounts.

Figure 12:
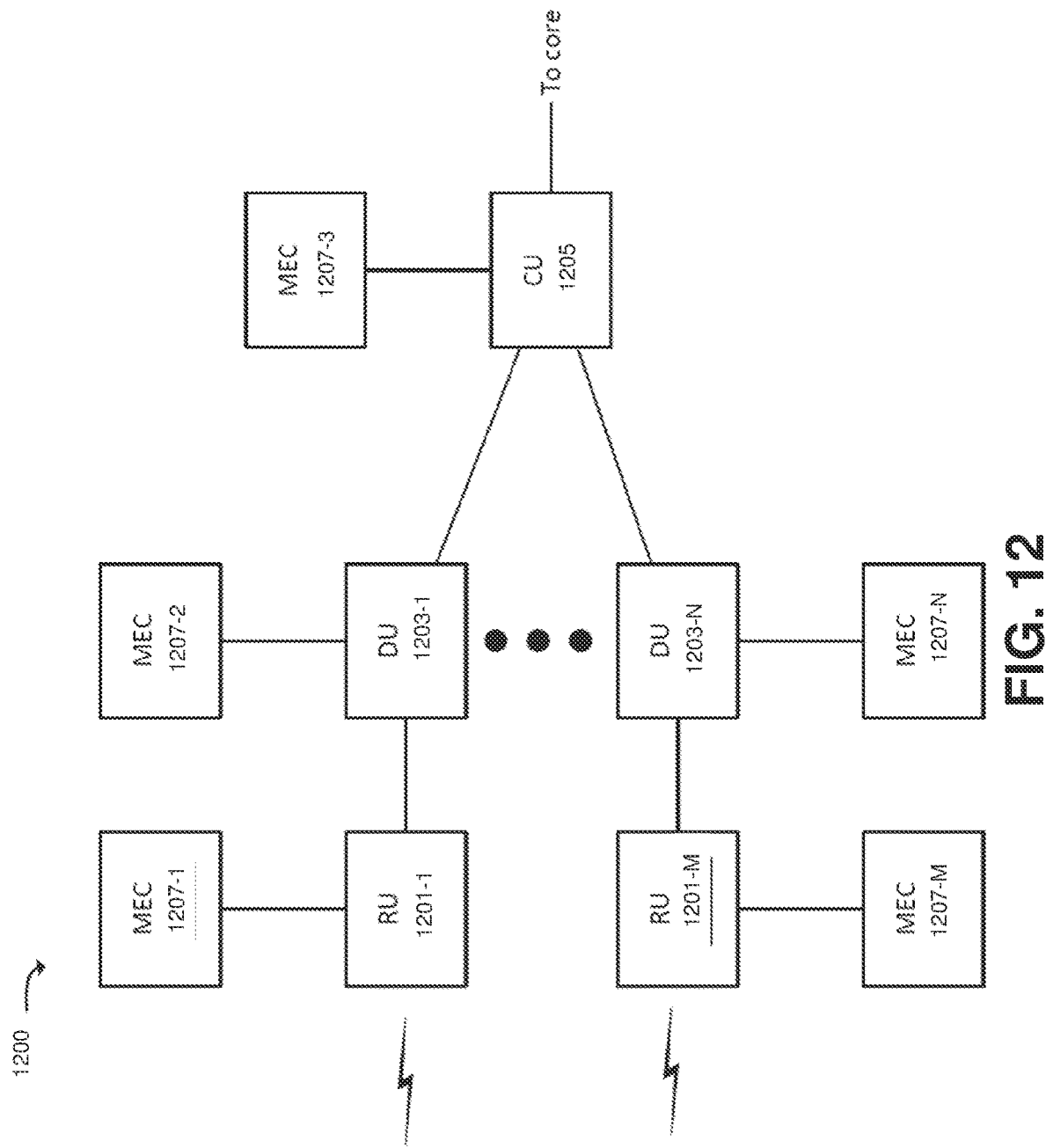
FIG. 12 is an illustration of an example network that may utilize and/or implement at least a portion of the techniques presented herein.

FIG. 12 illustrates an example Distributed Unit ("DU") network 1200, which may be included in and/or implemented by one or more RANs (e.g., RAN 1110, RAN 1112, or some other RAN). In some embodiments, a particular RAN may include one DU network 1200. In some embodiments, a particular RAN may include multiple DU networks 1200. In some embodiments, DU network 1200 may correspond to a particular gNB 1111 of a 5G RAN (e.g., RAN 1110). In some embodiments, DU network 1200 may correspond to multiple gNBs 1111. In some embodiments, DU network 1200 may correspond to one or more other types of base stations of one or more other types of RANs. As shown, DU network 1200 may include Central Unit ("CU") 1205, one or more Distributed Units ("DUs") 1203-1 through 1203-N (referred to individually as "DU 1203," or collectively as "DUs 1203"), and one or more Radio Units ("RUs") 1201-1 through 1201-M (referred to individually as "RU 1201," or collectively as "RUs 1201").

CU 1205 may communicate with a core of a wireless network (e.g., may communicate with one or more of the devices or systems described above with respect to FIG. 11, such as AMF 1115 and/or UPF/PGW-U 1135). In the uplink direction (e.g., for traffic from UEs UE 1103 to a core network), CU 1205 may aggregate traffic from DUs 1203, and forward the aggregated traffic to the core network. In some embodiments, CU 1205 may receive traffic according to a given protocol (e.g., Radio Link Control ("RLC")) from DUs 1203, and may perform higher-layer processing (e.g., may aggregate/process RLC packets and generate Packet Data Convergence Protocol ("PDCP") packets based on the RLC packets) on the traffic received from DUs 1203.

In accordance with some embodiments, CU 1205 may receive downlink traffic (e.g., traffic from the core network) for a particular UE 1103, and may determine which DU(s) 1203 should receive the downlink traffic. DU 1203 may include one or more devices that transmit traffic between a core network (e.g., via CU 1205) and UE 1103 (e.g., via a respective RU 1201). DU 1203 may, for example, receive traffic from RU 1201 at a first layer (e.g., physical ("PHY") layer traffic, or lower PHY layer traffic), and may process/ aggregate the traffic to a second layer (e.g., upper PHY and/or RLC). DU 1203 may receive traffic from CU 1205 at the second layer, may process the traffic to the first layer, and provide the processed traffic to a respective RU 1201 for transmission to UE 1103.

RU 1201 may include hardware circuitry (e.g., one or more RF transceivers, antennas, radios, and/or other suitable hardware) to communicate wirelessly (e.g., via an RF interface) with one or more UEs UE 1103, one or more other DUs 1203 (e.g., via RUs 1201 associated with DUs 1203), and/or any other suitable type of device. In the uplink direction, RU 1201 may receive traffic from UE 1103 and/or another DU 1203 via the RF interface and may provide the traffic to DU 1203. In the downlink direction, RU 1201 may receive traffic from DU 1203, and may provide the traffic to UE 1103 and/or another DU 1203.

RUs 1201 may, in some embodiments, be communicatively coupled to one or more Multi-Access/Mobile Edge Computing ("MEC") devices, referred to sometimes herein simply as ("MECs") 1207. For example, RU 1201-1 may be communicatively coupled to MEC 1207-1, RU 1201-M may be communicatively coupled to MEC 1207-M, DU 1203-1 may be communicatively coupled to MEC 1207-2, DU 1203-N may be communicatively coupled to MEC 1207-N, CU 1205 may be communicatively coupled to MEC 1207-3, and so on. MECs 1207 may include hardware resources (e.g., configurable or provisionable hardware resources) that may be configured to provide services and/or otherwise process traffic to and/or from UE 1103, via a respective RU 1201.

For example, RU 1201-1 may route some traffic, from UE 1103, to MEC 1207-1 instead of to a core network (e.g., via DU 1203 and CU 1205). MEC 1207-1 may process the traffic, perform one or more computations based on the received traffic, and may provide traffic to UE 1103 via RU 1201-1. In this manner, ultra-low latency services may be provided to UE 1103, as traffic does not need to traverse DU 1203, CU 1205, and an intervening backhaul network between DU network 1200 and the core network. In some embodiments, MEC 1207 may include, and/or may implement some or all of the functionality described above with respect to the device 1151, such as a voice command device, a communication device, an authentication service, a messaging service, a service, and/or a user device.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   determining that a communication device is connected over a first communication connection with a first base station having a first base station type associated with a first level of latency;
   identifying a selection criterion based upon a determination, by a network device, that an application is being executed on the communication device;
   responsive to identifying the selection criterion, selecting a mobility scheme indicative of a measurement trigger threshold from a set of mobility schemes based upon the selection criterion associated with the application being executed on the communication device; and
   responsive to selecting the mobility scheme, transmitting the measurement trigger threshold, of the mobility scheme selected based upon the selection criterion associated with the application being executed on the communication device, from the network device to the communication device to instruct the communication device to utilize the measurement trigger threshold to trigger a measurement of a second base station, wherein the mobility scheme is configured to prioritize the communication device maintaining the first communication connection with the first base station associated with the first level of latency over switching to a different communication connection with a different base station associated with a second level of latency higher than the first level of latency despite a first signal strength of the first communication connection being weaker than a second signal strength of the different communication connection.

2. The method of claim 1, comprising:
   transmitting a switching trigger threshold of the mobility scheme to the communication device to instruct the communication device to switch from communicating with the first base station to communicating with the second base station over a second communication connection in response to the measurement exceeding the switching trigger threshold.

3. The method of claim 1, comprising:
   defining the mobility scheme with a set of thresholds defined for the first base station type and a second base station type.

4. The method of claim 1, wherein the selection criterion is identified based upon at least one of a user characteristic, a data flow characteristic, a quality of service characteristic, or a network slicing identification characteristic.

5. The method of claim 1, wherein the selection criterion is identified based upon a latency characteristic of the application having a specified latency below a threshold.

6. The method of claim 1, comprising:
   transmitting a margin of the mobility scheme to the communication device to instruct the communication device to utilize the margin to determine whether to switch to the second base station.

7. The method of claim 1, comprising:
   transmitting hysteresis information of the mobility scheme to the communication device to instruct the communication device to utilize the hysteresis information to determine whether to switch to the second base station.

8. The method of claim 1, comprising:
transmitting an instruction to the communication device to disable switching to the second base station based upon the second base station having a second base station type and based upon a signal strength of the first communication connection with the first base station exceeding a threshold.

9. The method of claim 1, comprising:
defining the mobility scheme to prioritize handovers between base stations having the first base station type over handovers from the first base station type to a second base station type.

10. The method of claim 1, wherein the communication device switches from connecting to a mobile edge computing server through the first base station having the first base station type to connecting to the mobile edge computing server through the second base station having the first base station type.

11. The method of claim 1, comprising:
instructing the communication device to refrain from releasing communication with the first base station, while the communication device is within a second base station type anchor zone of the second base station, based upon the application being executed on the communication device benefiting from staying in communication with the first base station rather than switching to communicating with the second base station.

12. The method of claim 1, comprising:
instructing the communication device to directly handover from the first base station having the first base station type to the second base station having the first base station type without control from a second base station type anchor.

13. A system comprising:
a memory comprising instructions; and
a processor coupled to the memory, the processor configured to execute the instructions to facilitate performance of operations comprising:
determining that a communication device is connected over a first communication connection with a first base station having a first base station type associated with a first level of latency;
identifying a selection criterion based upon a determination that an application is being executed on the communication device;
responsive to identifying the selection criterion, selecting a mobility scheme indicative of a measurement trigger threshold from a set of mobility schemes based upon the selection criterion associated with the application being executed on the communication device; and
responsive to selecting the mobility scheme, transmitting the measurement trigger threshold, of the mobility scheme selected based upon the selection criterion associated with the application being executed on the communication device, to the communication device to instruct the communication device to utilize the measurement trigger threshold to trigger a measurement of a second base station, wherein the mobility scheme is configured to prioritize the communication device maintaining the first communication connection with the first base station associated with the first level of latency over switching to a different communication connection with a different base station associated with a second level of latency higher than the first level of latency despite a first signal strength of the first communication connection being weaker than a second signal strength of the different communication connection.

14. The system of claim 13, wherein the operations comprise:
transmitting a switching trigger threshold of the mobility scheme to the communication device to instruct the communication device to switch from communicating with the first base station to communicating with the second base station over a second communication connection in response to the measurement exceeding the switching trigger threshold.

15. The system of claim 13, wherein the operations comprise:
defining the mobility scheme with a set of thresholds defined for the first base station type and a second base station type.

16. The system of claim 13, wherein the selection criterion is identified based upon at least one of a user characteristic, a data flow characteristic, a quality of service characteristic, or a network slicing identification characteristic.

17. A non-transitory computer-readable medium storing instructions that when executed facilitate performance of operations comprising:
determining that a communication device is connected over a first communication connection with a first base station having a first base station type associated with a first level of latency;
identifying a selection criterion, by a network device, based upon a determination that an application is being executed on the communication device;
responsive to identifying the selection criterion, selecting a mobility scheme indicative of a measurement trigger threshold from a set of mobility schemes based upon the selection criterion associated with the application being executed on the communication device; and
responsive to selecting the mobility scheme, transmitting the measurement trigger threshold, of the mobility scheme selected based upon the selection criterion associated with the application being executed on the communication device, from the network device to the communication device to instruct the communication device to utilize the measurement trigger threshold to trigger a measurement of a second base station, wherein the mobility scheme is configured to prioritize the communication device maintaining the first communication connection with the first base station associated with the first level of latency over switching to a different communication connection with a different base station associated with a second level of latency higher than the first level of latency despite a first signal strength of the first communication connection being weaker than a second signal strength of the different communication connection.

18. The non-transitory computer-readable medium of claim 17, wherein the operations comprise:
transmitting an instruction to the communication device to disable switching to the second base station based upon the second base station having a second base station type and based upon a signal strength of the first communication connection with the first base station exceeding a threshold.

19. The non-transitory computer-readable medium of claim 17, wherein the operations comprise:
defining the mobility scheme to prioritize handovers between base stations having the first base station type over handovers from the first base station type to a second base station type.

20. The non-transitory computer-readable medium of claim 17, wherein the operations comprise:
instructing the communication device to refrain from releasing communication with the first base station, while the communication device is within a second base station type anchor zone of the second base station, based upon the application being executed on the communication device.

* * * * *